Sept. 17, 1957

H. HOLZWARTH 2,806,996

PHASE MODULATION OF IMPULSES

Filed May 20, 1955

Inventor:
Herbert Holzwarth.

By
Atty

United States Patent Office 2,806,996
Patented Sept. 17, 1957

2,806,996

PHASE MODULATION OF IMPULSES

Herbert Holzwarth, Munich, Germany, assignor to Siemens & Halske Aktiengesellschaft, Munich and Berlin, Germany, a corporation of Germany Application May 20, 1955, Serial No. 509,975
In Germany October 1, 1948

Public Law 619, August 23, 1954
Patent expires October 1, 1968

6 Claims. (Cl. 332—9)

Figure 1:
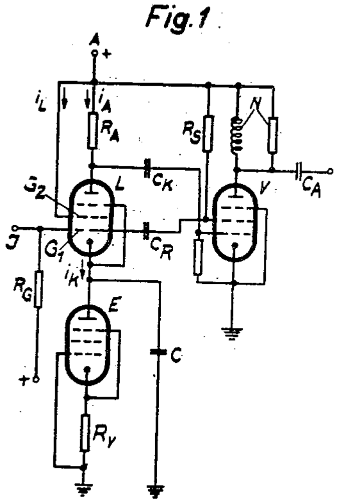

This invention is concerned with phase modulation of impulses.

Methods have been developed for a variety of purposes, especially in wireless multi-channel transmission with very short (decimeter) waves, in which different pulse series of a pulse train are modulated with various messages transmitted, for example, such that each twelfth or each twenty-fourth pulse is modulated with one and the same message while the pulses lying therebetween are correspondingly modulated respectively with eleven and twenty-three other messages.

Other types of pulse modulation have also become known, especially pulse ampltiude modulation, impulse length modulation, and pulse phase modulation. All these types of modulation may be used in connection with the above-mentioned multi-channel transmission technique; the pulse phase modulation being preferred over the two others because it exhibits several advantages, for example, a high degree of freedom from trouble.

In the pulse phase modulation, the pulses of an unmodulated pulse train which follows in regular time intervals are being transmitted sooner or later as compared with such intervals depending upon the degree of modulation thereof. The shifting of an individual pulse from its unmodulated succession, the median position of which is predetermined, may therefore be effected proportional to the modulation voltage so as to produce with respect to each median position a delayed release of the pulse responsive to positive modulation voltage, while producing with respect to said median position a speedy release responsive to negative modulation voltage or vice versa.

Prior pulse phase modulation systems generally require special tubes of rather complex construction, usually cathode ray tubes, which must be provided with as many deflection systems as there are transmission channels to be controlled by the corresponding tube, and the plates of such tubes must also be of special design.

As compared with this situation, the present invention provides a pulse phase modulation system which permits use of as small a number of ordinary amplifier tubes as possible.

This object is according to the invention realized by causing successively regularly following pulses of a pulse train, which have been amplitude modulated by known means, to charge a capacitor in accordance with the peak voltage at any instant obtaining, and to utilize the instants of cessation of the discharges of such capacitor for the release of the phase modulated pulses.

The invention accordingly proceeds from pulses which have been amplitude modulated in desired manner and by known means. A capacitor is charged for the duration of the amplitude modulated pulse to the peak value effected by the modulation. The duration of the subsequent discharge of the capacitor will accordingly depend upon the magnitude of its charge effected by the pulse and is therefore dependent upon the amplitude of the input pulse. Since there is only a very short interval available for charging the capacitor—the pulse duration varying in practical embodiments of multi-channel transmission systems between 0.5 and 1.0 $\mu$s.—the capacitor is suitably placed into the cathode lead of a tube, and the amplitude modulated input pulses are conducted to the grid thereof.

The arrangement may be such as to trigger a relaxation oscillator at the conclusion of a capacitor discharge, which may take place over a desired resistance network or over a tube, the oscillator thereupon producing, at that instant, an impulse. Such impulse accordingly appears as compared with the original amplitude modulated input pulse the later the longer the discharge lasts, that is, with a delay corresponding to the magnitude of the amplitude of the input pulse. The conversion of the amplitude modulation into a phase modulation is thereby practically accomplished.

In order to produce always with certainty an invariably uniform discharge current which is independent of the charge condition of the capacitor, there is used in accordance with a further feature of the invention, a pentode as a discharge tube, on which is maintained a plate voltage of a magnitude such that the tube will upon further increase by the voltage of the capacitor always operate within the range of the plate current—plate voltage—curve in which the plate current is substantially independent of the plate voltage.

This is obtained, in a particularly suitable embodiment of a circuit for carrying out the invention, by the provision of a positive bias for the grid of the charging tube, the cathode of which is placed at the same potential as the plate of the discharge tube and the capacitor. The two tubes are accordingly in series so far as the plate current is concerned. The positive grid bias of the charging tube causes continuous flow of current through the discharge tube independent of the magnitude of the voltage on its plate or on the capacitor. If the capacitor is charged over the charging tube to a given voltage, the grid potential of the charging tube will determine the operating instant of the discharge tube at which the discharge of the capacitor starts over such tube, regardless of the magnitude of the voltage of the charge. It is accordingly possible by suitable choice of the grid bias, to provide for an operation in which the entire discharge action lies, as previously noted, within the curve of the field characteristics of the discharge tube in which the plate voltage has practically no effect upon the magnitude of the plate current.

The charging of the capacitor by the charging tube is furthermore suitably effected, not over the plate-cathode path, but substantially over the screen grid-cathode path. A resistor is for this purpose connected in the plate lead to the charging tube, at which the voltage drop can be tapped which is produced thereon by the plate current.

The operations which have to be considered in connection with the two tubes and the capacitor are as follows:

After the capacitor has been charged by the input pulse over the screen grid-cathode circuit of the charging tube, discharge of the capacitor back through the charging tube is blocked due to the high cathode potential thereof. The capacitor however discharges now over this tube with a discharge current strength determined by the characteristics of the tube, whereby the voltage at the capacitor and therewith the plate voltage of the discharge tube as well as the cathode potential of the charging tube diminish gradually substantially linearly. At the instant when the voltage at the capacitor has become so low that the positive grid bias of the charging tube is able to cause it to pass current, plate current will flow again through the charging tube and over the discharge tube to ground. The start of the plate current flow coincides exactly with the instant at which the discharge of the capacitor is concluded, that is, respectively sooner or later after the appearance of the original charging impulse depending upon the amplitude of such impulse. The instant of recommencement of the plate current through the charging tube, that is, the instant of the appearance of a voltage drop at the plate resistor of the charging tube is accordingly usable for the production of a new phase modulated pulse.

In accordance with another feature of the invention, the production of the phase modulated pulse is effected by means of a differentiating network which produces a voltage pulse during the rise of the plate current of the charging tube. Since a pulse is also produced by the differentiating network upon cessation of the plate current through the charging tube (during the charging of the capacitor by the input pulse, which pulse always retains the same position relative to the input pulse, therefore being unsuitable for phase modulation, such pulse is cut off by a negatively biased cut-off tube which follows the differentiating network.

The voltage drops at the plate resistance of the charging tube are in the case of customary amplifier tubes not so great that it would be possible to produce by known differentiating circuits pulses of a magnitude necessary at impulse lengths of less than 1 $\mu$s, and for this reason, there is provided a further amplifier stage in a circuit following the charging tube. If the output voltage of this second tube is fed back to the control grid of the charging tube (preferably over the screen grid) there will result a kind of multi-vibrator circuit which is adapted to provide for a very steep voltage rise and decay.

The above indicated and further objects and features of the invention will appear from the description which is rendered below with reference to the accompanying drawing in which—

Figure 2:
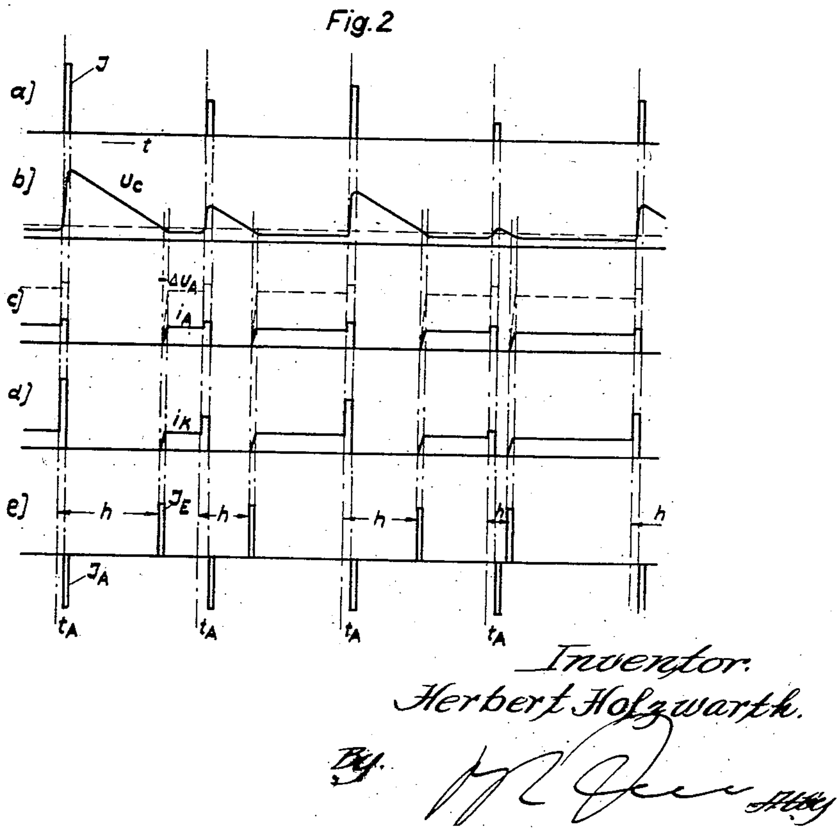

Fig. 1 shows in diagrammatic manner a circuit adapted for practicing the invention in one embodiment thereof; and Fig. 2 shows curves to illustrate the operations at various points of the circuit in relation to time.

Referring now to Fig. 1, reference C indicates a capacitor which is charged over a charging tube E. The input pulses are conducted at J to the control grid $G_1$ of the charging tube L which is positively biased over the grid leak resistor $R_G$. The capacitor is charged from the plate voltage source A over the screen grid $G_2$ of the charging tube L, to a potential, the magnitude of which depends upon the magnitude of the pulse at the control grid of the tube L.

Fig. 2 represents a series of amplitude modulated pulses J appearing in regular succession at the control grid $G_1$ of the tube L. The voltage at the cathode of the tube L and the charging voltage $U_c$ of the capacitor C and the voltage at the plate of the discharge tube E increase for the duration of the pulse approximately in the manner indicated in curve 2*b*. Upon cessation of the pulse at the control grid of the tube L, the discharge of the capacitor C will be blocked over this tube due to the positive charge of the capacitor and the high positive potential of the cathode of the charging tube L caused thereby. The capacitor will therefore discharge over the tube E, its voltage $U_c$ practically linerally diminishing gradually as indicated in Fig. 2*b*. Upon dropping of the voltage at the capacitor C to a point at which the tube L can pass current again due to its positive grid bias, plate current $i_A$ will flow through the tube L and through the tube E which is of a magnitude dependent upon the grid bias on the tube E which is adjustable by means of the resistor $R_V$. The course of this plate current is indicated in Fig. 2*c*. It produces at the plate resistor $R_A$ of the charging tube L a voltage drop $+U_A$ which is conducted to the grid of the amplifier tube V over the coupling capacitor $C_K$. In order to accelerate the potential change at R, the amplified voltage surge is fed back from the screen grid of the tube V to the control grid of the charging tube L over the feedback capacitor $C_R$.

In the anode circuit of the tube V, there is provided a differentiating network N by means of which the plate current through the tube L is upon inception converted into a pulse which is released over the capacitor $C_A$ and further utilized as desired.

The course of the voltage drop $+U_A$, at the plate resistor $R_A$ is indicated in Fig. 2*c* in dotted lines.

In Fig. 2*d* is shown the cathode current of the charging tube L which has two components, namely, the plate current through the plate resistor $R_A$ and the charging current of the capacitor C which flows predominantly over the screen grid $G_2$ of the tube L.

Fig. 2*e* shows the pulses produced by the differentiating network N in back of the tube V depending respectively upon the increase and decay of the plate current or rather to say by the voltage drop at the plate resistor $R_A$ of the tube L.

The negative pulses $J_A$ appearing always in identical spacing relative to the time $t_A$ upon cessation of the input pulse J are cut off by a cut-off stage omitted from Fig. 1, while the positive pulses $J_E$ which always appear upon inception of the plate current in the tube L, represent the phase modulated working pulses which are conducted further for amplification thereof. They are, as compared with the dot-dash lines $t_A$, marking the instants of the appearance of the input pulses, produced later by a time interval *h* which is the greater the higher the amplitude of the respective input pulses. The time element of the new impulses is proportional to the amplitude of the input pulse, due to the time-linearity of the discharge.

Changes may be made within the scope and spirit of the appended claims.

I claim:

1. In a pulse phase modulation system, comprising a capacitor, a circuit including a pentode for controlling the charging of said capacitor, means for conducting to said pentode successive regularly spaced pulses including amplitude modulated input pulses so as to charge said capacitor with each input pulse to a peak voltage corresponding to that of the respective amplitude modulated input pulse, the duration of the discharge of said capacitor following each charging thereof being dependent upon the amplitude of the corresponding input pulse, a differentiating network, and means for utilizing the respective instances of discharge of said capacitor for determining the release of corresponding phase modulated pulses, said last named means comprising circuit means for controlling the operation of said differentiating network by the increase and decrease of the plate current of said pentode for the purpose of converting said increase and decrease into phase modulated pulses.

2. A system and cooperation of parts according to claim 1, comprising circuit means for charging said capacitor by the cathode current of said pentode.

3. A system and cooperation of parts according to claim 1, comprising plate bias means for said pentode for producing a discharge current of said capacitor which is invariably of identical magnitude independent of the charging condition thereof.

4. A system and cooperation of parts according to claim 1, comprising a further pentode over which said capacitor discharges, means for producing the plate bias of said further pentode by a positive bias placed on said first pentode, the cathode of said first pentode and the plate of said further pentode and said capacitor being on identical potential.

5. A system and cooperation of parts according to claim 1, comprising means for charging said capacitor over a circuit including the screen grid of said pentode, a resistor disposed in the plate circuit of said pentode, and means for obtaining at said resistor a voltage produced by the plate current which is as to time of occurrence determined by the duration of discharge of said capacitor.

6. A system and cooperation of parts according to claim 5, comprising an amplifier tube, means for conducting to said amplifier tube the voltage obtained at said resistor, and means for feeding such voltage from the screen grid of said amplifier back to the control grid of said first named pentode.

References Cited in the file of this patent

UNITED STATES PATENTS

| | | |
|---|---|---|
| 2,435,496 | Guanella et al. | Feb. 3, 1948 |
| 2,467,793 | Wheeler | Apr. 19, 1949 |